United States Patent [19]
Hato

[11] 3,946,953
[45] Mar. 30, 1976

[54] CRUSHER FOR BREAKING DISCARDED GLASS ARTICLES INTO GEM-LIKE GRANULES

[75] Inventor: Kuniki Hato, Imabari, Japan

[73] Assignee: Nobutoshi Ohuchi, Japan

[22] Filed: Oct. 30, 1974

[21] Appl. No.: 519,283

[52] U.S. Cl. .................. 241/79.2; 241/99; 241/163
[51] Int. Cl.² ......................................... B02C 13/13
[58] Field of Search.............. 241/99, 100, 161–163, 241/188 R, 69, 79, 79.2

[56] References Cited
UNITED STATES PATENTS

| | | | |
|---|---|---|---|
| 2,628,036 | 2/1953 | Hall | 241/99 X |
| 3,353,756 | 11/1967 | Morgenson | 241/99 |
| 3,554,454 | 1/1971 | Gruendler | 241/188 R X |
| 3,823,878 | 7/1974 | Ishikura | 241/188 R X |

Primary Examiner—Roy Lake
Assistant Examiner—E. F. Desmond
Attorney, Agent, or Firm—Laurence, Stokes & Neilan

[57] ABSTRACT

A shaft is rotatably supported on both the ends of the housing. The housing has an inlet for charging discarded glass articles and an outlet for discharging glass fragments. Crushing bars are mounted on the shaft and arranged from near the inlet toward the neighborhood of outlet of the housing. The glass articles charged through the inlet into the housing are kicked by the crushing bars toward the inner surface of the housing and broken into fragments while being rebounded on the inner surface of the housing. The glass fragments dropped down onto the bottom of the housing are agitated, by poking bars mounted on the shaft in the neighborhood of the outlet, while being subjected to impact forces, to permit them to be reduced to substantially rounded gem-like granules.

11 Claims, 11 Drawing Figures

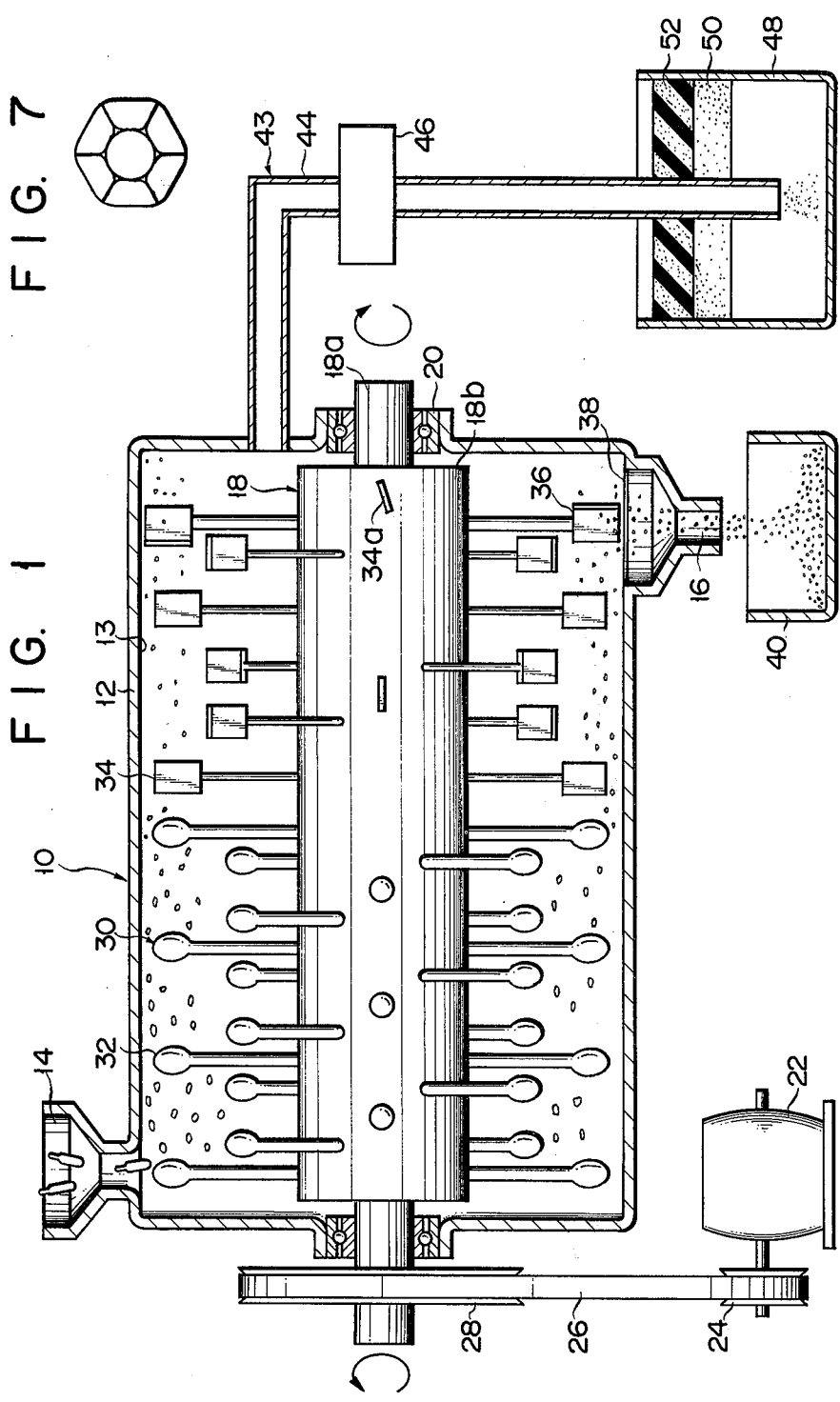

CRUSHER FOR BREAKING DISCARDED GLASS ARTICLES INTO GEM-LIKE GRANULES

This invention relates to a crusher for crushing discarded glass articles, and in particular a crusher for breaking discarded glass articles into gem-like granules.

Recently, ampules, beverage bottles, beer bottles, cosmetic containers, food bottles etc. have been used in greater numbers and a greater number of such glass articles are discarded every year. Out of these articles, some are recovered for reuse, some are crushed and dissolved for reproduction and some are broken into fragments for reutilization.

A variety of such crushers has been proposed up to this date. For example, some crushers are adapted to crush charged glass articles into fragments by a plurality of gears and some are adapted to break charged glass articles into fragments by a plurality of hammers mounted on a vertically arranged shaft.

In the former case, the glass articles charged from atop can not be broken, on a large scale, into finer fragments due to the intermeshing of the gears. This type of crusher is complicated in structure and high in cost. In the latter case, the glass articles charged from atop are dropped by their own weight down into the outlet without being broken into sufficiently small fragments. In order to crush the discarded glass articles into smaller fragments it is necessary to continuously arrange a plurality of hammers in a direction perpendicular to the shaft. This complicates the structure of the crusher.

For any of the conventional crushers it is very difficult to obtain gem-like glass granules free of any angular edges.

It is accordingly the object of this invention to provide an improved crusher which is free from the drawbacks as encountered in the prior art crushers, simple in construction and capable of effectively breaking discarded glass articles, on a large scale, into gem-like granules free of any angular edges.

In one aspect of this invention there is provided a crusher comprising a housing having at one end portion an inlet for charging discarded glass articles and at the other end portion an outlet for discharging their fragments or granules; a rotary means rotatably supported on both the ends of the housing; means for driving the rotary means; and a plurality of crushing hammer means mounted on the outer surface of the rotary means and adapted to kick glass articles toward the inner surface of the housing to cause them to be broken into fragments.

The discarded glass articles charged into the housing are kicked by the crushing hammer means toward the inner surface of the housing and broken into fragments. The fragments are frictionally contacted, during the rotation of the housing, with each other or with the inner surface of the housing to cause them to be rounded off. As a result, the glass articles can be effectively crushed on a large scale and gem-like granules free of any angular edges are obtained.

This invention can be more fully understood from the following detailed description when taken in conjunction with the accompanying drawings, in which:

FIG. 1 is a front view schematically showing one embodiment of this invention;

Figure 6A:
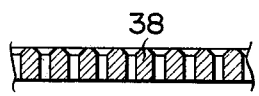
Figure 6B:
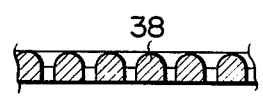

FIGS. 6A and 6B each show a modified form of collecting means; and

FIG. 7 is an enlarged view showing a rounded gem-like granule as obtained from a crusher according to this invention.

As illustrated in FIG. 1 a crusher 10 includes a cylindrical housing 12 having at one end portion an inlet 14 for charging discarded glass articles and at the other end portion an outlet 16 for discharging the fragments of the glass articles. If an inner wall 13 of the housing 12 is either polygonal shaped or indented, a high crushing effect can be obtained. The crusher 10 further includes a shaft 18 rotatably supported in bearings 20 disposed at both the ends of the housing 12, and a motor 22 for driving the shaft 18. The driving force of the motor 22 is transmitted through a pulley 24, endless belt 26 and pulley 28 to the shaft 18. The shaft 18 comprises supporting portions 18a and an enlarged section 18b. Crushing hammer means 30 are mounted on the outer surface of the enlarged section 18b of the shaft 18. The crushing hammer means 30 are divided into two groups i.e. a first group mounted on the inlet side of the outer surface of the enlarged section 18b of the shaft 18 and a second group mounted on the outlet side of the outer surface of the enlarged section 18b of the shaft 18.

The crushing hammer means of the first group, each, constitute crushing bars 32 having an oval-shaped hammer at its free end. The crushing bars 32 are spirally arranged from below the inlet 14 toward the middle of the enlarged section 18b of the shaft 18. In contrast, the crushing hammer means 30 of the second group, each, constitute a poking bar 34 having a spoon-like portion or a plate-like poking portion at its free end.

The poking bars 34 are spirally arranged from near the outlet 16 toward the middle of the enlarged section 18b of the shaft 18.

Figure 2A:
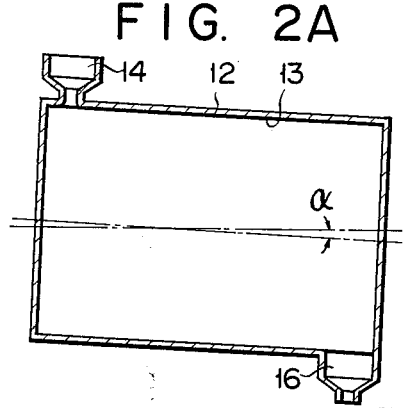
FIGS. 2A and 2B are front views schematically showing another arrangement of the housing and a modified housing, respectively.
Figure 2B:
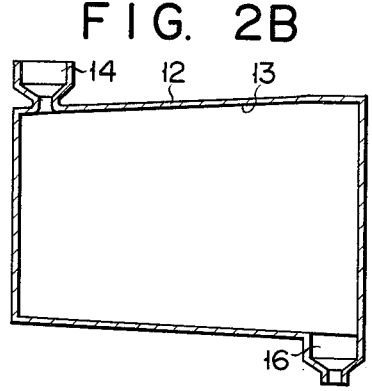
Figure 3A:
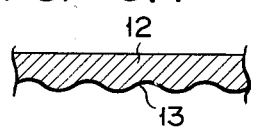
FIGS. 3A and 3B are longitudinal and transverse cross-sectional views, respectively, showing another modified housing.

With the crusher 10 so constructed, the discarded glass articles charged through the inlet 14 into the housing 12 are kicked by the crushing bars 32 toward the inner surface of the housing and moved toward the outlet 16, while being frictionally rolled on the inner surface of the housing. This movement is effected due to the spiral arrangement of the crushing bars 32. If the crushing bars 32 are not arranged in a spiral fashion, the housing 12 may be inclined, for example, at an angle of $\alpha$ to the horizontal as shown in FIG. 2A, or be flared toward the other end of the housing 12, as shown in FIG. 2B, in the neighborhood of which the outlet 16 is provided. Where the inner wall 13 of the housing 12 is circumferentially undulated, as shown in FIG. 3A, in the neighborhood of the inlet 14, the glass articles are effectively crushed by collision with the inner surface 13 of the housing 12. In this case, the glass articles crushed by the crushing bars hit against the fragments rebounded from the inner surface of the housing to cause them to be frictionally contacted with each other. Therefore, the undulating surface of the housing is effective to break the glass articles into rounded granules.

Figure 3B:
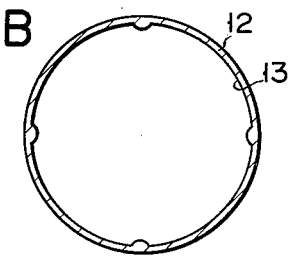

As shown in FIG. 3B, four rib-like paddings 1 - 2mm in height can be equiangularly formed by welding on the inner surface 13 of the housing 12 along the axis of the shaft 18 and in the neighborhood of the inlet 14 to attain a more effective crushing.

The glass fragments moved toward the middle of the housing are agitated by the poking bars 34 as well as by vortexes created by the poking bars 34 of the crushing hammer means 30 to cause them to be frictionally contacted with each other within the vortex. During this process the glass fragments are broken into gem-like granules by frictional forces therebetween and impact forces against the inner wall 13 of the housing 12. The vortexes created by the poking bars 34 perform the double function of cooling the inside of the housing 12 and eliminating a dust. The poking portion of the poking bar 34 may be mounted slantwise on the poking bar so as to move the granules toward the outlets. The spiral arrangement of the poking bars 34 is effective to cause the glass fragments to be frictionally rolled to permit them to to reduced to rounded gem-like granules.

Figure 4A:
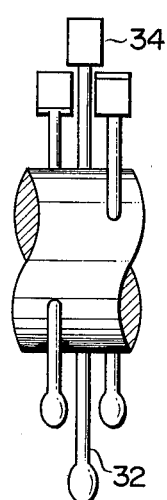
FIGS. 4A and 4B are fragmentary views each showing another arrangement of crushing hammer means.
Figure 4B:
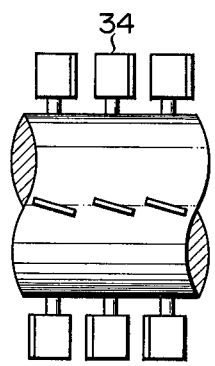
Figure 5:
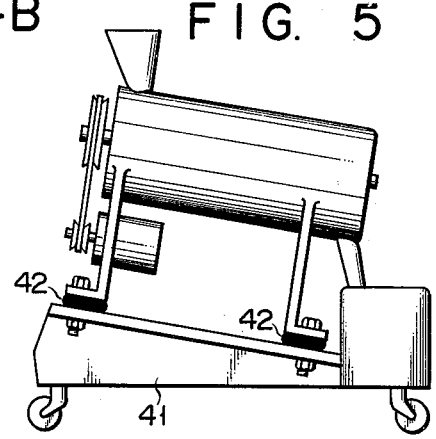
FIG. 5 is a schematic view showing the manner in which the housing is mounted to a support base.

The crushing bar 32 and poking bar 34 may be arranged opposite to each other, as shown in FIG. 4A, in a double spiral fashion. Since, in this case, the poking bar 34 breaks, like the crushing bar 32, glass articles into fragments, it is required to have a rigid structure. It is, however, preferred that the crushing bars 32 be collectively mounted on that portion of the enlarged section 18b of the shaft 18 which is in the neighborhood of the inlet 14, and that the crushing bar 32 and poking bar 34 be mounted opposite to each other, on the remaining portion of the enlarged section 18b of the shaft 18.

As shown in FIG. 4A the crushing bar 32 and poking bar 34 may be arranged opposite to each other, in such a double spiral fashion, axially of the shaft 18. In this case, the glass articles are effectively broken into smaller fragments by frictional forces therebetween and impact forces against the inner surface 13 of the housing 12.

Above the outlet 16, recoiling arms 36 are mounted on the enlarged section 18b of the shaft 18 and a filter mesh 38 is provided on the inner surface 13 of the housing 12 to permit passage of the gem-like granules having a size smaller than a predetermined size. The gem-like granules passed through the filter mesh 38 drop down into a bucket 40. The recoiling arms 36 serve not only to stir the gem-like granules accumulated on the filter mesh 38, but also to kick larger glass fragments toward the inlet 16. For this reason, a substantially plate-like recoiling portion is mounted slantwise as shown in FIG. 1 on the free end of the recoiling arm 36. When on the side of the outlet 16 a poking bar 34a is mounted slantwise, as shown in FIG. 1, in a position short of the end of the enlarged section 18b of the shaft 18, larger glass fragments are kicked toward the inlet 14 of the housing 12 and further broken into smaller fragments.

Means for periodically vibrating the filter mesh 38 may be provided to facilitate dropping the granules through the filter mesh 38 into the bucket 40. A mechanical means utilizing, for example, a cam or an electrical means utilizing an electromagnet may be considered as such means. In an attempt to intentionally vibrate the housing per se in a periodic fashion the housing 12 may be mounted, through an elastic body 42 such as a spring or rubber, on a support base 41 with an unbalancing weight mounted on the shaft 18. In this case, the housing 12 loses its balance for each rotation of the shaft and is vibrated, thus facilitating effectively dropping the granules down into the bucket 40. The housing 12 may be vibrated by mounting, on the one hand, direct to the support base 41 and, on the other, through the elastic body 42 to the support base 41.

As the filter mesh 38 use may be made of a metal plate having a network of perforations the top end portion of which is chamfered or flared outwardly as shown in FIGS. 6A and 6B to further remove irregularly projecting edges of the glass fragments.

A dust and nasty smell produced within the housing 12 are processed by a dust collector 43 having a pipe 44 whose one end is opened into the interior of the housing 12 in the neighborhood of the end of the enlarged shaft section 18b. A suction means 46 such as a blower are arranged within the pipe 44 to permit the dust etc. suctioned through the suction port to be discharged into a dust processing tank 48 which is closed by a deodorant layer 50 and sponge layer 52. As a result, the dust etc. discharged into the dust processing tank 48 is separated from an air and settled on the bottom of the tank 48, while the nasty smell is absorbed into the deodorant layer 50 and sponge layer 52 without polluting the outside atmosphere.

With the crusher according to this invention the shaft 18 is rotated at a high speed to cause the glass articles to be kicked against the inner surface 13 of the housing 12 to permit them to be broken into smaller fragments. Then, the fragments are fully agitated by the poking bars 34. During this process, frictional forces are imparted to the fragments to permit them to be reduced to rounded gem-like granules. The poking bar 32 serves not only to stir the fragments, but also to cause the fragments to collide with the inner surface 13 of the housing 12. The fragments are sequentially moved toward the outlet 16 due to the spiral arrangement of the crushing bars or the outwardly flaring configuration of the housing 12 or the angular arrangement of the housing 12. According to this invention, therefore, the glass articles can be effectively broken, on a large scale, into fragments and then reduced to gem-like granules free of any angular edges.

The crusher according to this invention is simple in construction and low in cost with the attendant advantages.

Since the fragments are so reduced to rounded, polygonal gem-like granules as shown in FIG. 7, they are convenient to handle and easy in treatment. The gem-like granules are used not only for a decorative purpose but also as an aggregate for concrete or a refractory additive. If the granules are used for an asphalt pavement, a braking effect is enhanced so that a possible traffic accident is prevented. Thus, the gem-like granules find such a wide application. According to this invention, therefore, the discarded glass articles, which constitute one of public nuisances, can be completely broken into rounded gem-like granules for disposal. The granules can also be utilized as a useful material.

Though the crusher according to this invention can be used particularly for crushing discarded glass articles, it can also be used for disposing of discarded plastics articles etc.

This invention is not restricted to the above-mentioned embodiment. It should be noted that any modification, addition, substitution etc. may be made within the scope of this invention. For example, a pair of housings, one having only crushing bars provided therein and the other having only poking bars provided therein, may be continuously arranged to permit discarded glass articles to be broken into granules.

I claim:

1. A crusher for breaking discarded glass articles into gem-like granules, comprising a housing having at one end an inlet for charging the glass articles and at the other end an outlet for discharging the granules; a rotary means rotatably supported on both ends of the housing, means for driving the rotary means; crushing means mounted on the outer surface of the rotary means and adapted to kick the glass articles toward the inner surface of the housing to cause them to be broken into fragments; selector means disposed at the outlet of the housing and selectively passing granules having a particle size less than a predetermined particle size; and recoiling means mounted on the rotary means and substantially above the outlet of the housing to cause glass fragments accumulated over the selector means to be kicked toward said one end of the housing.

2. A crusher according to claim 1 in which said selector means includes a plate member having a network of outwardly flared holes.

3. A crusher according to claim 2 in which said recoiling means includes recoiling bars having a plate-like recoiling section at their free ends.

4. A crusher according to claim 3 in which said housing is mounted slantwise.

5. A crusher according to claim 3 in which said housing is flared from said one end toward said other end.

6. A crusher according to claim 3 in which said housing is mounted through an elastic member and unbalancing weight means is further mounted on the rotary means to disturb the rotary means in an unbalanced way.

7. A crusher according to claim 3 in which there are further provided a dust collector whose suction inlet is opened into said other end of the housing, and a dust separating means having a dust treating reservoir into which an outlet of the dust collector is opened.

8. A crusher according to claim 3 in which the crushing means includes a first group of crushing bars having a mass-like crushing hammer head at their free ends and axially arranged from near the inlet of the housing toward said other end of the housing, and a second group of poking bars having a plate-like section at its free end and axially arranged in the neighborhood of the outlet of the housing.

9. A crusher according to claim 8 in which said crushing means are spirally arranged from said one end toward said other end of the housing.

10. A crusher according to claim 8 in which said rotary means has members each pierced therethrough in a direction perpendicular to the axis of the rotary means, the member having at one end a crushing bar formed integral therewith and at the other end a poking bar formed integral therewith.

11. A crusher according to claim 8 in which the poking bars are equiangularly arranged on the outer surface of the rotary means, in a plane perpendicular to the axis of the rotary means and in a manner that the plate-like section mounted on the free end of the poking bars is arranged at an angle to the axis of the rotary means.

* * * * *